United States Patent
Tewari et al.

(10) Patent No.: US 8,645,179 B2
(45) Date of Patent: *Feb. 4, 2014

(54) SYSTEMS AND METHODS OF PARTIAL SHIFT SWAPPING

(75) Inventors: Swati Tewari, Santa Clara, CA (US); Michael Robert Bourke, San Francisco, CA (US); Jason Fama, Foster City, CA (US); Shmuel Korenblit, San Mateo, CA (US)

(73) Assignee: Verint Americas Inc., Alpharetta, GA (US)

( * ) Notice: Subject to any disclaimer, the term of this patent is extended or adjusted under 35 U.S.C. 154(b) by 1545 days.

This patent is subject to a terminal disclaimer.

(21) Appl. No.: 11/540,320

(22) Filed: Sep. 29, 2006

(65) Prior Publication Data

US 2008/0091501 A1    Apr. 17, 2008

(51) Int. Cl.
*G06Q 10/00* (2012.01)
(52) U.S. Cl.
USPC .......................................... 705/7.16; 705/7.13
(58) Field of Classification Search
USPC ............................................ 705/9, 7.13, 7.16
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |

(Continued)

FOREIGN PATENT DOCUMENTS

| | | |
|---|---|---|
| EP | 0453128 A2 | 10/1991 |
| EP | 0773687 A2 | 5/1997 |

(Continued)

OTHER PUBLICATIONS

Lau, "On the Complexity of Manpower Shift Scheduling", Computers Ops Res. vol. 23, No. 1, pp. 93-102, 1996.*

(Continued)

*Primary Examiner* — Thomas L Mansfield, Jr.
(74) *Attorney, Agent, or Firm* — Andrus, Sceales, Starke & Sawall, LLP

(57) ABSTRACT

Systems and methods of partial shift swapping are disclosed. An exemplary method comprises the steps of: receiving a partial shift swap request from an agent; determining a disposition of the partial shift swap request by applying a set of criteria associated with a validation rule to the partial shift swap request; and if the disposition indicates the partial shift swap request is approved, updating a schedule to reflect the partial shift swap request. An exemplary computer-readable medium has a computer program stored thereon. The computer program comprises computer-executable instructions for performing a computer-executed method of requesting a partial shift swap. The method comprises the steps of: receiving a partial shift swap request from an agent; determining a disposition of the partial shift swap request by applying a set of criteria associated with a validation rule to the partial shift swap request; and if the disposition indicates the partial shift swap request is approved, updating a schedule to reflect the partial shift swap request.

20 Claims, 8 Drawing Sheets

(56) References Cited

U.S. PATENT DOCUMENTS

| | | |
|---|---|---|
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIllwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,587,831 B1 * | 7/2003 | O'Brien .......................... 705/8 |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,957,188 B1 * | 10/2005 | Dellevi et al. .................... 705/9 |
| 6,959,078 B1 | 10/2005 | Eilbacher et al. |
| 6,965,886 B2 | 11/2005 | Govrin et al. |
| 7,225,981 B2 * | 6/2007 | Jongebloed .................. 235/385 |
| 7,343,316 B2 | 3/2008 | Goto et al. |
| 2001/0000962 A1 | 5/2001 | Rajan |
| 2001/0032335 A1 | 10/2001 | Jones |
| 2001/0037229 A1 | 11/2001 | Jacobs et al. |
| 2001/0042001 A1 | 11/2001 | Goto et al. |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |

(56) References Cited

U.S. PATENT DOCUMENTS

| | | | |
|---|---|---|---|
| 2004/0165717 A1 | 8/2004 | Mcllwaine et al. | |
| 2005/0096962 A1* | 5/2005 | Narasimhan et al. | 705/9 |
| 2005/0138560 A1 | 6/2005 | Lee et al. | |
| 2005/0177407 A1* | 8/2005 | Barni | 705/8 |
| 2006/0224477 A1* | 10/2006 | Garcia et al. | 705/32 |
| 2007/0239484 A1* | 10/2007 | Arond et al. | 705/2 |

FOREIGN PATENT DOCUMENTS

| | | |
|---|---|---|
| EP | 0989720 | 3/2000 |
| GB | 2369263 | 5/2002 |
| WO | WO 98/43380 | 11/1998 |
| WO | WO 00/16207 | 3/2000 |
| WO | 2004107119 A2 | 12/2004 |

OTHER PUBLICATIONS

Osborn, "Scheduling Student Employees doesn't have to make you crazy", SIGUCCS '05, Nov. 6-9, 2005, Monterey, CA.*
"Customer Spotlight: Navistar International," Web pae, unverified print date of Apr. 1, 2002.
"DKSystems Integrates QM Perception with OnTrack for Training," Web page, unvereified print date of Apr. 1, 2004, unverified cover date of Jun. 15, 1999.
"OnTrack Online Delivers New Web Functionality," Web page, unverified print date of Apr. 2, 2002, unverified cover date of Oct. 5, 1999.
"Price WaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8*th* World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM,* unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).

Cross: "Sun Microsystems—the SunTAN Story," Internet Time Group 8 ( © 2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning,* THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1):62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).

(56) References Cited

OTHER PUBLICATIONS

Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of End-User Training Needs," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You on (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News.
*Interactive TV Wars Heat Up*, Industry Standard.
Needle. *Will the Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.

\* cited by examiner

SYSTEMS AND METHODS OF PARTIAL SHIFT SWAPPING

FIELD OF THE DISCLOSURE

The present disclosure relates to customer centers, and more specifically, to scheduling of a workforce.

DESCRIPTION OF THE RELATED ART

A manager in a customer center typically uses workforce scheduling software to create a schedule which assigns workers (agents) to shifts throughout the workday. The scheduler chooses an optimal schedule that meets constraints while optimizing goals. Inputs such as predicted workload (e.g., call volume in 15-minute intervals, average call duration) and work rules (e.g., maximum shift length, possible shift start time, break requirements) are treated as constraints. Inputs such as expected level of service (e.g., call hold time) are treated as goals. The scheduler generates many possible schedules, and examines the possibilities to find a schedule that optimizes goals while remaining within the constraint boundaries.

In the real world, the generated schedule of agent shifts may be modified, for various reasons, after initial creation. For example, agents may request time off, or wish to move from one workday to another. It is desirable for a shift modification to affect only a portion of the shift rather than the entire shift. For example, an agent assigned to work Friday 9 AM-5 PM may wish to take only the afternoon off. It is also desirable to allow an agent to plan ahead and coordinate the partial shift modification with another agent rather than requiring the partial shift modifications to be initiated through a supervisor.

SUMMARY

Systems and methods of partial shift swapping are disclosed. An exemplary method comprises the steps of: receiving a partial shift swap request from an agent; determining a disposition of the partial shift swap request by applying a set of criteria associated with a validation rule to the partial shift swap request; and if the disposition indicates the partial shift swap request is approved, updating a schedule to reflect the partial shift swap request. An exemplary computer-readable medium has a computer program stored thereon. The computer program comprises computer-executable instructions for performing a computer-executed method of requesting a partial shift swap. The method comprises the steps of: receiving a partial shift swap request from an agent; determining a disposition of the partial shift swap request by applying a set of criteria associated with a validation rule to the partial shift swap request; and if the disposition indicates the partial shift swap request is approved, updating a schedule to reflect the partial shift swap request.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
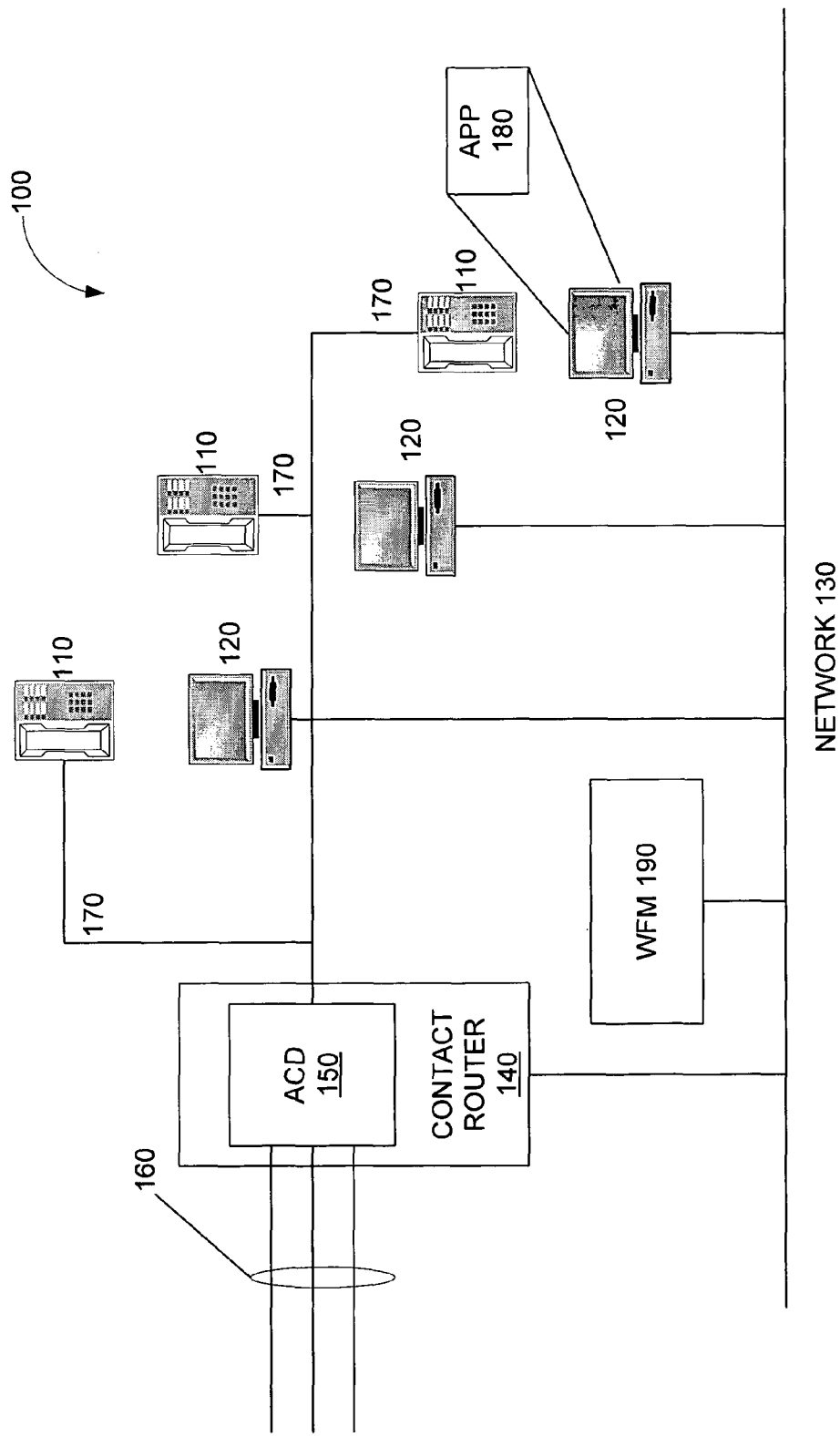
FIG. 1 is a block diagram of a customer center environment.

FIG. 1 is a block diagram of a customer center environment 100. Customer center 100 is staffed by agents who handle incoming and/or outgoing contacts. Although the traditional and most common form of contact is by phone, other types of contacts can be used, such as text chat, web collaboration, email, and fax. An agent workspace includes an agent phone 110 and a workstation computer 120. A network 130 connects one or more of the workstations 120.

A contact router 140 distributes or routes contacts (incoming or outgoing) to an agent position. Voice over Internet Protocol (VoIP) calls and computer-based contacts (e.g., chat, email) are routed over one or more data networks, and distributed over network 130 to one of the agent workstations 120. Contact router 140 may include an automatic call distributor (ACD) 150 to route phone contacts. The embodiments described herein will refer to ACD 150 instead of contact router 140, but analogous contact router actions and operations are intended to be captured by this disclosure. Note that a predictive dialer (not shown) could be used for directing outbound calls to agents for handling.

If an agent is not available to handle a particular call, ACD 150 puts the call into a queue, which effectively places the caller on hold. When an agent is available, ACD 150 connects the outside trunk line 160 carrying the phone call to one of the agents. More specifically, ACD 150 connects the outside trunk line 160 to the trunk line 170 of the selected agent.

When an agent is ready to handle contacts, the agent first logs into ACD 150. This login notifies ACD 150 that the agent is available to take calls. An agent's ACD state changes throughout the workday, as the agent performs work activities such as handling calls, performing after-call work, and taking breaks. An example list of states includes available, busy, after-call work, and unavailable.

While handling a contact, the agent interacts with one or more applications running on workstation 120. By way of example, workstation applications could provide the agent with access to customer records, product information, ordering status, and transaction history. The applications may access one or more business databases (not shown) via the network 130.

Customer center 100 also includes a workforce management system (WFMS) 180. WFMS 180 performs many functions. One such function is providing a customer center supervisor or manager with information about agents and contacts, both historical and real-time. Another function is supplying the supervisor with information on how well each agent complies with customer center policies. Yet another function is calculating staffing levels and creating agent schedules based on historical patterns of incoming contacts. The functionality of the entire WFMS 180 is typically divided among several applications, some of which have a user interface component, and WFMS 180 comprises the suite of applications.

In the environment described above, the workers assigned to shifts are customer center agents. However, the scheduling methods and systems described herein are also applicable to scheduling other kinds of workers in other types of work environments. Therefore, the remaining embodiments will refer to workers rather than agents.

A customer center may include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Figure 2:
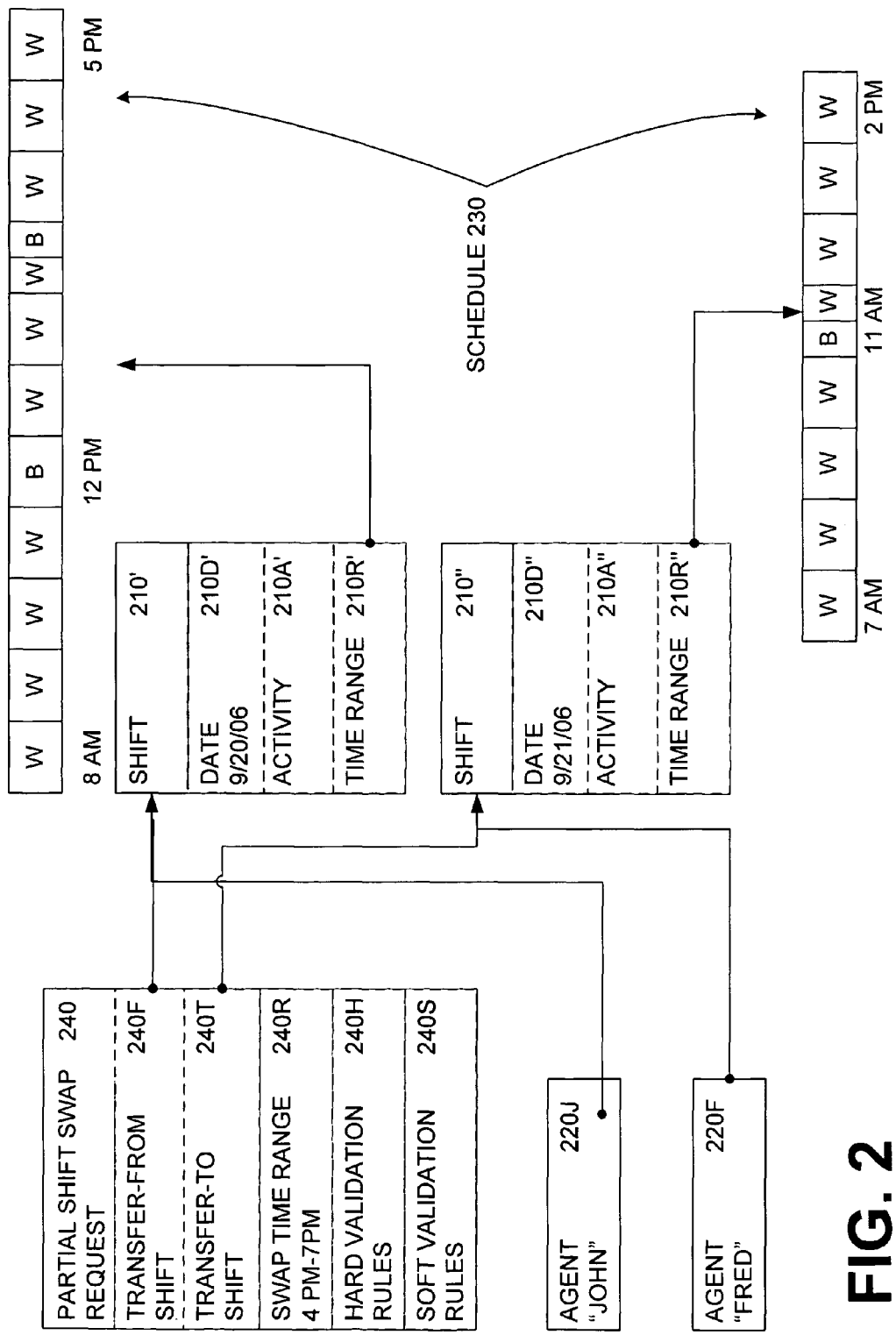
FIG. 2 is a block diagram illustrating various objects involved in one embodiment of a system and method for partial shift swapping.

FIG. 2 is a block diagram illustrating various objects involved in one embodiment of a system and method for partial shift swapping. In this embodiment, one agent assigned to a shift containing a work activity offers a portion of that shift to another agent who accepts the shift. This embodiment is known as a "one-way swap" because the agent offering his shift does not accept the other agent's shift in return. Another "two-way swap" embodiment will be described below, in which the agents exchange shifts: the agent offering his shift also accepts the other agent's shift in return.

Shifts (210', 210") include a date (210D), at least one activity (210A), and a time range (210R). In one embodiment, the shift time range 210R specifies a start time and an end time. In another embodiment, the shift time range 210R specifies a start time and a duration. Each shift is assigned to one agent 220. A schedule 230 includes shifts 210 within a particular time period.

A partial shift swap request 240 includes an offering shift (240O), an accepting shift (240A), and a swap time range (240R) which represents a sub range within the time range 210R of the offering shift 240O. The agent to which an offering shift (240O) is assigned to is referred to as an "offeror agent", and the agent to whom an accepting shift (240A) is assigned to is referred to as an "acceptor agent".

When put into effect, the partial shift swap request 240 removes a portion of the offering shift (240O) from the associated agent, and allocates the shift portion to the agent associated with the accepting shift (240A240R). The portion is specified by swap time range 240R. That is, a swap request specifying an offering shift (240O) on Sep. 20, 2006 from 9 AM to 5 PM and a swap time range 240R of 10 AM-1 PM is a request for an offeror agent to give away, to an acceptor agent, the 10 AM-1 PM portion of the offeror agent's 9 AM to 5 PM shift on Sep. 20, 2006.

Partial shift swap request 240 also includes a set of hard validation rules (240H) and a set of soft validation rules (240S). These rules will be applied to request 240 to determine the disposition of the request (e.g., automatically approved, automatically denied, or held for manager review). Each of the soft validation rules 240S includes criteria for comparison with the swap request. Each soft validation rule 240S also includes a behavior which determines how the result of the criteria application affects the disposition of the request. Validation rule criteria and behaviors will be discussed later in connection with FIGS. 5 and 6. A person of ordinary skill in the art should understand how the set of validation rules used with a particular (one-way or two-way) swap request can be selected and/or entered via a user interface component of WFMS 180. Therefore, this process will not be described in further detail.

In the example of FIG. 2, shift 210', which is assigned to John (220J), has a date (210D') of Sep. 20, 2006, and a time range (210R') of 8 AM to 7 PM. The activities in shift 210' include: work activities from 8 AM to 12:00 PM, from 1:00 PM to 3:30 PM, and from 4 PM to 7 PM; and break activities from 12:00 PM to 1:00 PM and from 3:30 PM to 4 PM. Shift 210", which is assigned to Fred (220F), has a date (210D") of Sep. 21, 2006 and a time range (210R") of 7 AM to 2 PM. The activities in shift 210" include: work activities from 7 AM to 11:00 AM, and from 11:30 PM to 2:00 PM; and a break activities from 11:00 AM to 11:30 AM.

Partial shift swap request 240 represents a request for John to offer the 4 PM-7 PM portion of his shift 210' on Sep. 20, 2006 to Fred: the offering shift (240O) is set to shift 210' (Sep. 20, 2006, assigned to John); the accepting shift 240A is set to shift 210" (Sep. 20, 2006, assigned to Fred); and swap time range 240R specifies "4 PM-7 PM" in the accepting shift. Thus, after partial shift swap request 240 is put into effect, schedule 230 is updated so that John has a new "Time Off" activity from 4 PM to 7 PM on Sep. 20, 2006, and Fred has a new work activity from 4 PM to 7 PM on Sep. 20, 2006. In this "one-way swap" embodiment, John did not accept a shift, or a partial shift, from Fred.

Figure 3:
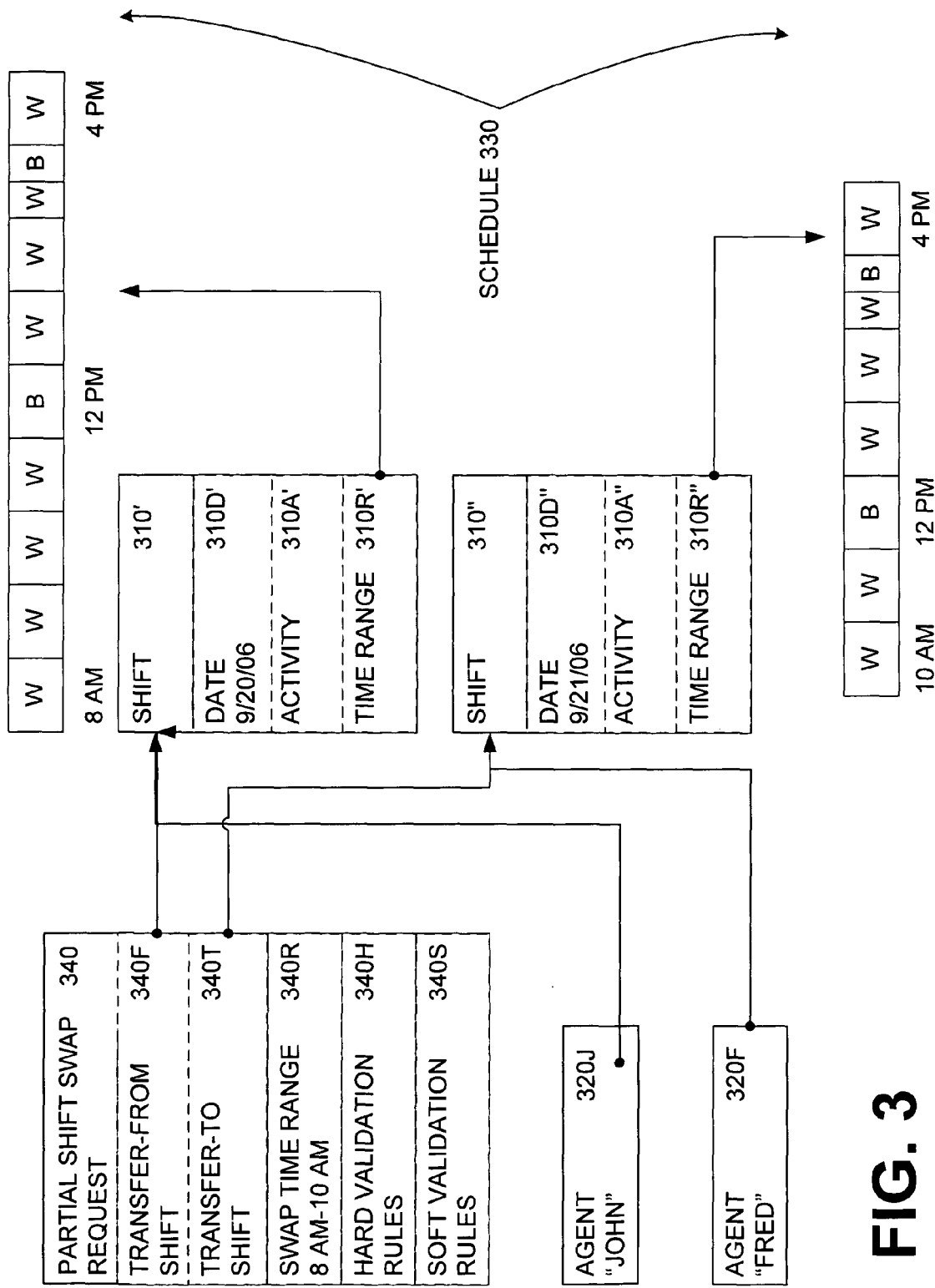
FIG. 3 is a block diagram illustrating various objects involved in another embodiment of a system and method for partial shift swapping.

FIG. 3 is a block diagram illustrating various objects involved in another embodiment of a system and method for partial shift swapping. In this embodiment, one agent assigned to a shift containing a work activity offers a portion of that shift to another agent, and also accepts the other agent's shift. This embodiment is known as a "two-way swap". A person of ordinary skill in the art should understand that although one-way and two-way partial shift swaps are discussed here as separate objects, a single data structure could be used instead with a type field to distinguish between the two.

Shifts (310', 310") include a date (310D), a time range (310R) and at least one activity (310A). Each shift is assigned to one agent 320. A schedule 330 includes shifts 310 within a particular time period.

A partial shift swap request 340 includes an offering shift (340O), an accepting shift (340A), and a time range (340R) which represents a sub range within the time range 310R of the offering shift 340O. When the partial shift swap request 340 is put into effect, schedule 330 is updated so that a portion of the offering shift (340O) is exchanged with the corresponding portion of the accepting shift (340R), where the portion is specified by time range 340R. Since both shifts are associated with agents, the effect is to exchange a portion of one agent's shift with a corresponding portion of another agent's shift. Partial shift swap request 340 also includes a set of hard validation rules (340H) and a set of soft validation rules (340S). These rules will be applied to request 340 to determine whether the request is automatically approved, automatically denied, or held for manager review.

In the example of FIG. 3, shift 310', which is assigned to John (320J), has a date (310D') of Sep. 20, 2006, and a time range (310R') of 8 AM to 5 PM. The activities in shift 310' include: work activities from 8 AM to 12:00 PM, from 1:00 PM to 3:30 PM, and from 4 PM to 5 PM; and break activities from 12:00 PM to 1:00 PM and from 3:30 PM to 4 PM. Shift 310", which is assigned to Fred (320F), has a date (310D") of Sep. 21, 2006 and a time range (310R") of 10 AM to 5 PM. The activities in shift 310" are analogous to those in shift 310'.

Partial shift swap request 340 represents a request for John to exchange the 8 AM-1 AM portion of his shift 310' on Sep. 20, 2006 with Fred's shift on Sep. 21, 2006: the accepting shift (340O) is set to shift 310' (Sep. 20, 2006, assigned to John); the accepting shift 340A is set to shift 310" (Sep. 21, 2006, assigned to Fred); and time range 340R specifies "8 AM-10 AM" in the accepting shift. Thus, after partial shift swap request 340 is put into effect, schedule 330 is updated so that Fred has a new work activity from 8 AM to 10 AM on Sep. 20, 2006, and John has a new work activity from 8 AM to 10 AM on Sep. 21, 2006.

Figure 4:
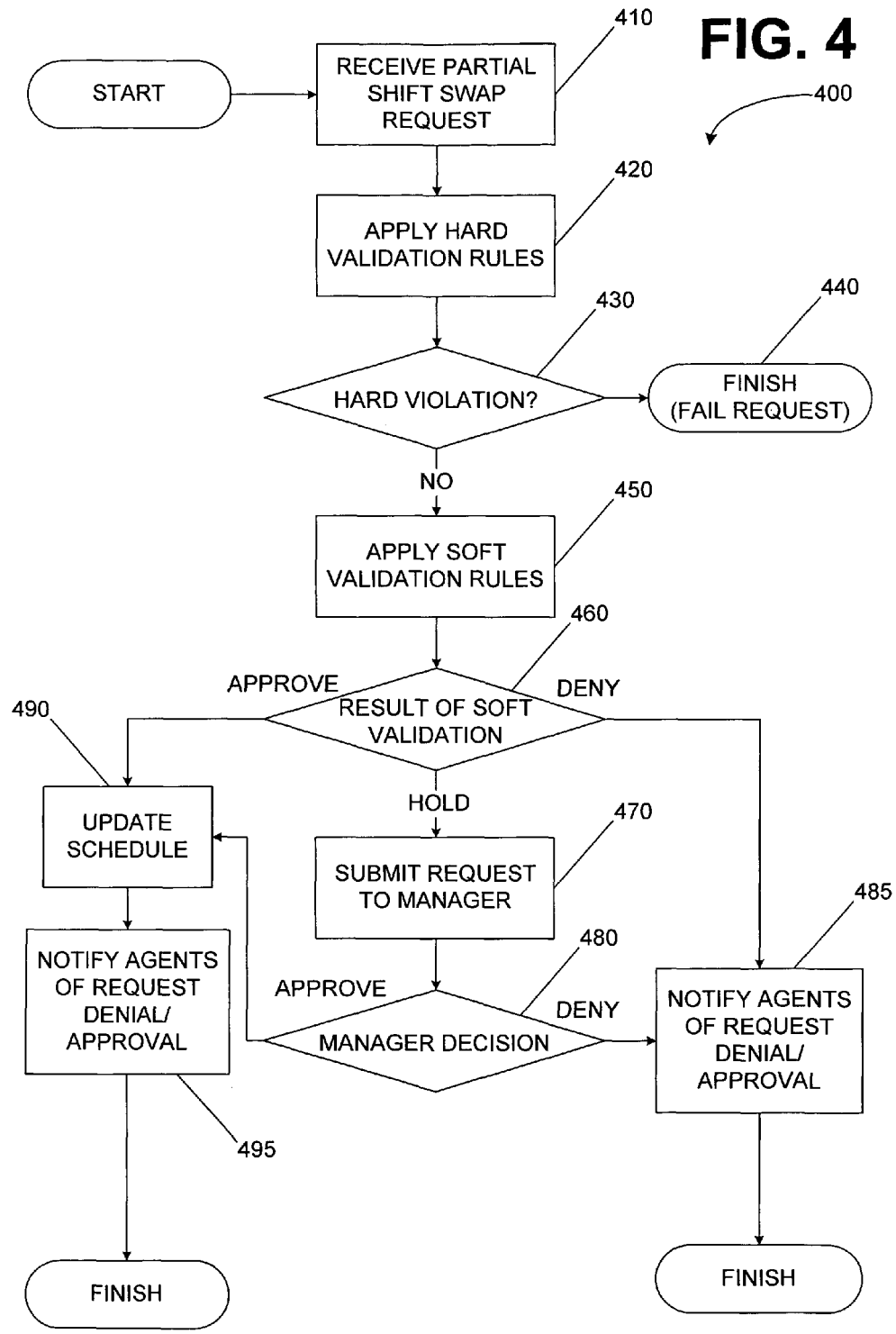
FIG. 4 is a flowchart describing an exemplary system and method for partial shift swapping.

FIG. 4 is a flowchart describing an exemplary system and method for partial shift swapping. The process 400 begins at block 410, which receives a partial shift swap request (240 or 340). Next, at block 420, a set of hard validation rules (240H or 340H) are applied, where "hard" validation rules are those which cause the request to fail if violated. (Hard validation rules are discussed in further detail below.) Processing continues at block 430, where results of the application of hard validation rules, at block 420, are examined. If the partial shift swap request (240 or 340) violates the hard validation rules, the process terminates at block 440 with a failure of the request.

If the request does not violate the hard validation rules, processing continues at block 450, where a set of soft validation rules (240S or 340S) are applied. The result of applying "soft" validation rules is approving, denying, or holding the request, depending on which of the validation rules are violated or not violated. In contrast, the result of applying the hard validation rules is to fail the request or to continue with application of soft validation rules. Block 450, which applies soft validation rules, is discussed in further detail below, in connection with FIG. 6.

At block 460, the result of applying soft validation rules is examined. If the result is "Suspend", then processing continues at block 470, where the request is submitted to a manager or supervisor for approval or denial. A person of ordinary skill in the art should understand how a user interface component of WFMS 180 can be used by a manager, or other customer center personnel, to process a submitted request. Therefore, this process will not be described in further detail. In some embodiments, information about rule violations and/or rule compliance, as determined during the hard and/or soft rule validation process, is made available to manager during the swap request review process.

Next, block 480 examines the result of the manager's decision. If the manager's decision is "Deny", processing continues at block 485, which will be discussed below. If the manager's decision is "Approve", processing continues at block 490, which will be discussed below.

Returning to the discussion of block 450, if the result of applying the soft validation rules at block 450 is "Deny", then processing continues at block 485, where the offeror and acceptor agents are notified that the partial shift swap request (240 or 340) is denied. In some embodiments, the manager is also notified. Processing of the request is then complete.

If the result of applying soft validation rules at block 450 is "Approve", then processing continues at block 490, where the schedule (230 or 330) is updated to reflect the partial shift swap. The process of updating the schedule will be discussed in more detail in connection with FIG. 5. Next, at block 495, the offeror and acceptor agents are notified that the partial shift swap request (240 or 340) is approved. In some embodiments, the manager is also notified. Processing of the request is then complete.

Figure 5:
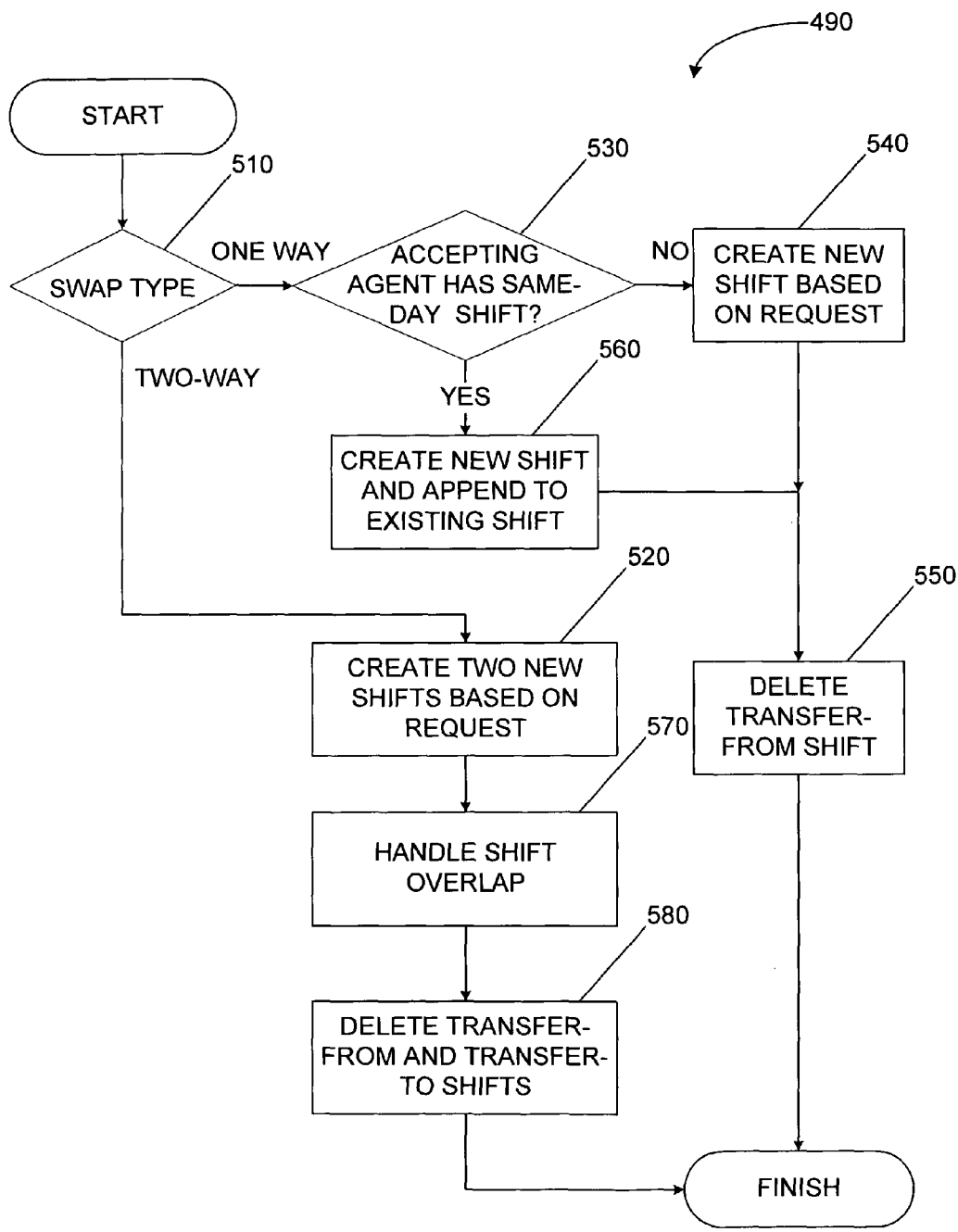
FIG. 5 is a flowchart of the schedule update process of FIG. 4.

FIG. 5 is a flowchart of the schedule update process (490) of FIG. 4, which is performed when a partial shift swap request (240 or 340) is approved. At block 510, the swap type is determined as one-way or two-way. If two-way, processing continues at block 520, which will be discussed later. If one-way, processing continues at block 530.

Block 530 determines whether the acceptor agent (the one associated with the accepting shift field 240A) is already assigned a shift starting on the date (210D) in the offering shift (240O). If the agent does not have a shift already assigned that day, processing continues at block 540, where a new shift is created and assigned to the acceptor agent. The new shift uses the date in the offering shift (240O), the activities (210A) in the offering shift (240O) and the time range (240R) of the one-way swap request 240.

Work activities and shift-related activities (e.g., breaks) that fall within the swap range 340R are copied from the offering shift (340O) to the accepting shift (340A). In some embodiments, work rules are taken into account filling the accepting shift (340A) with shift-related activities. Thus, breaks are moved into the add or remove breaks from the newly constructed shift such that the agent complies with work rules. For example, accepting a 1-hour partial shift that is adjacent to an already-assigned 9-hour shift results in a 10-hour shift. If work rules require that four 15-minute breaks are scheduled in a 10-hour shift, then accepting the 1-hour partial shift includes placing a new break in the 10-hour shift, regardless of whether the 1-hour offering shift portion included a break activity. Similarly, removing portions from an offering shift (340O) could result in removal of a break if the shortened offering shift (340O) falls below a work-rule minimum.

Calendar-based activities such as Meetings and Training are not copied, but remain with the original agent. For example, consider an agent assigned to a meeting from 10:00-10:30 AM. When this agent offers the 8:00 AM-11:00 AM portion of this shift, then the work activities (8:00-10:00 AM and 10:30-11:00) are copied to the accepting shift, but the 10:00-10:30 meeting is not. After the swap, the offeror agent still has a meeting at 10:00 AM, and the accepting shift (340A) is filled with work activities from 8:00-11:00 AM, which includes the 10:30-11:00 slot. Processing continues at block 550, where the offering shift (240O) is deleted. After work-related, shift-related, and calendar-based activities are transferred to the offering shift (340O), as described above, processing for the one-way swap request 240 is then complete.

If block 530 determines that the agent does have a shift already assigned that day, processing continues at block 560, which creates a new shift object (210) using the date in the offering shift (240O), and setting the shift start time (contained in field 210R) to the start time indicated in the swap request time range (240R). Any gap between the new shift start time and the already-assigned shift is filled in with a gap activity. The new shift is associated with the accepting agent (the one associated with the accepting shift field 240A). Processing continues at block 550, where the offering shift (240O) is deleted. Processing for the one-way swap request 240 is then complete.

Returning to block 510, if the swap type is two-way, then the swap is accomplished by creating two new shift objects (310) at block 520. One shift object 310 is initialized with the date in the accepting shift (340A) of the swap request, and is associated with the offeror agent (also through accepting shift 340A). The other shift object is initialized with the date in the offering shift (340O) of the swap request, and is associated with the offering agent (also through offering shift 340O). Any gap between the start time of a new shift and the start time of an already-assigned shift is filled with a gap period, in a manner analogous to gap handling for one-way swaps.

In creating the two new shift objects 310, block 520 also fills in shift activities 310A. Calendar-based activities such as Meetings and Training are not swapped, but remain with the agent. Work activities and shift-related activities (e.g., breaks) that fall within the swap range 340R are copied from the accepting shift (340A) to the offering shift (340O), and vice versa. For example, consider an agent assigned to a 9 AM to 5 PM shift, with one break at 9:30-9:45 AM, lunch break at 11:30 AM-12 PM, and another break at 3:00-3:15 AM. When this agent offers the 8:00 AM-11:45 AM portion of this shift, then the following activities are copied to the pick-up shift: the 9:00-9:30 work activity; the 9:30-9:45 AM break; the 9:45-11:30 work activity; and the first half of the lunch break activity, from 11:30-11:45. Note that the 11:45 PM-12:00 PM lunch break activity remains with the offeror agent, since that time range is outside of the swap range 340R.

After block 520 creates the two replacement shift objects, the original accepting shift (340A) and offering shift (340O) are deleted at block 570. Processing of a two-way swap request 340 continues at block 580, which handles overlap as follows. If there is an overlap between an agent's original shift and the new swapped portion, the activities in the new portion overwrite or replace the activities in the original portion. Processing for the two-way swap request 340 is then complete.

Having discussed the process of shift swapping, including applying validation rules, and updating the schedule for an approved request, exemplary hard and soft validation rules will now be described in more detail. As described above, violation of a hard validation rule causes the partial shift swap request 240 to fail. One hard validation rule is violated if one of the agents participating in the shift swap is not associated with a valid organization. Another hard violation rule is violated if an already-assigned shift starts during the organization-defined day of the accepting shift. Both the published and the unpublished schedule are checked. For two-way swaps, both the offering shift and the accepting shift are checked. For one-way swaps, the accepting shift is not checked if it has type "time off".

Yet another hard validation rule ensures that the offering shift and the accepting shift are both valid (i.e. the shifts themselves still exist in the schedule for the agent that the shift belongs to). For one-way swap, this includes verifying that the accepting shift has a time off activity, and that the offering shift is valid. For a two-way swap, this includes verifying that both the offering shift and the accepting shift are valid shifts (in the published and unpublished schedule).

Another hard validation rule checks that swapped shifts still exist in the schedule (unpublished) and have not been modified in any way (e.g., shift, time range). For two-way swap, both shifts are verified. This rule also verifies that shift locations in the unpublished schedule before the swap are still empty.

As described above, soft validation rules (240S or 340S) are applied to determine whether a partial shift swap request (240 or 340) is disposed of by approval, denial, or suspension for manager review. More specifically, the criteria for each rule is applied to the request, resulting in a violation or a pass for each rule. Criteria for several exemplary soft validation rules will be described next, followed by further details about the process of applying soft validation rules.

Some soft validation rules are related to the duration of the portion of the shift being swapped. One such soft validation rule is violated when the duration of the swapped portion is less than a specified minimum. Another soft validation rule is violated when the duration of the shift portion remaining after the swap is less than a specified maximum. Either minimum can be expressed as an absolute time period or as a percentage of the duration.

A partial shift swap request (240 or 340) is associated (directly or indirectly) with one agent (220) in the case of a one-way swap or two agents in the case of a two-way swap. Several soft validation rules are related to the associated agent or agents (220). One agent-related soft validation rule, which applies to a two-way swap, is violated if the two agents are not associated with the same organization during their respective shifts before and after the swap. Another agent-related soft validation rule ensures that the two agents are associated with the same campaign. As applied to one-way swaps, this rule is violated if the two agents are not associated with the same campaign on the day of the shift being swapped. As applied to two-way swaps, this rule is violated if the two agents are not associated with the same campaign during their respective shifts before the swap and after the swap.

Yet another agent-related soft validation rule is violated when the two agents do not have the same skills for the active campaign queue during the time period of the shift involved. Yet another agent-related soft validation rule is violated when the two agents do not have the same skill proficiency level for the active campaign queue during the time period of the shift involved.

Each campaign is associated with a set of work rules which specify how many hours an agent can work or be paid for in a time period. Some soft validation rules check for compliance with these work rules. One validation rule is violated when a weekly maximum of hours worked is exceeded, or a weekly minimum is not met, for the shift portion being offered and for the shift portion being accepted. Another soft validation rule is violated when the total paid shift duration exceeds the daily maximum as a result of the swap. One variation of this rule calculates the shift duration using the organization's day boundaries (e.g. 6:00 AM to 5:59 AM). Another variation calculates the shift duration using a rolling 24-hour period before and after the shift. Yet another validation rule is violated when both shifts, or shift portions, in a two-way swap do not include the same number of paid hours. Another soft validation rule is violated if the swapped shift portions do not fall within the same organization-defined week.

Shifts may contain various non-work activities (e.g., agent is unavailable), or related-to-work activities (e.g., training). One soft validation rule is violated when the swap includes any of a list of prohibited activities. Some soft validation rules relate to handling activities assigned to specific calendar days during a swap. One such soft validation rule is violated when the swap results in a particular calendar-assigned activity falling outside of the agent's shifts as the result of the swap, if that activity is required to take place during an agent's assigned shift.

Another soft validation rule is violated under either of two conditions. The first condition occurs when a swap would result in any overlap between the accepting shift and an unavailable activity. For example, suppose a shift assigned from 9 AM-3 PM was offered for swap. An acceptor agent with an unavailable activity that includes any time between 9 AM-3 PM meets the first condition, and the rule is violated. Note that no overlap at all is allowed: unavailability from 8:30-9:15 violates the rule, as does unavailability from 2:45-3:15 PM.

The second condition occurs when a swap would result in the loss of a calendar-assigned activity or a time-off activity which overlaps a shift. Put another way, swapped shifts should overlap the exact same portion with calendar-assigned and time-off activities, otherwise the rule is violated.

An example involving the second condition is as follows. Suppose an offeror agent has an assigned shift 9 AM-12 PM with a calendar-assigned activity from 10 AM-11 AM. The first condition would be met if the accepting shift starts at 10:30 or 11:30, since the accepting shift overlaps with the calendar-assigned activity. The rule would be violated, and the swap request may be denied, depending on the rule behavior. However, an accepting shift from 9:30 AM-12:00 does not overlap the calendar-assigned activity from 10 AM-11 AM, but rather completely includes the calendar-assigned activity. Therefore, the first condition is not met, and the rule is not violated.

Some partial shift swaps result in either an overlap with an already-assigned shift, or a gap between an already-assigned shift and the newly assigned shift. One soft validation rule is violated when the duration of the resulting overlap is more than a specified maximum. Another soft validation rule is violated when the duration of the resulting gap is less than a specified minimum or is outside a specified range (e.g., 1-5 hours). In one embodiment, if both the gap range and minimum are specified, a violation occurs only if both the conditions are violated.

Now that example criteria have been discussed, application of the rules to the swap request and disposition based on the result will now be discussed. Each of the set of rules (240S or 340S) is applied to a partial shift swap request (240 or 340). Behavior associated with each rule, and/or the set of rules, then determines how the request is disposed of: approved, denied, or held for manager review. Rule behavior works as follows. Two types of rule behavior are specific to a particular rule: one automatically denies the request when that rule is violated; and the other automatically grants the request when that rule passes. Other types of rule behavior are global to the set of soft validation rules. One of these global behaviors automatically denies the request when any rule in the set is violated. Another global behavior automatically grants the request when any rule in the set passes. Two other global behaviors force a manager review of the request: one suspends the request for manager review even when application of the rule would otherwise indicate an automatic approval; the other suspends the request for manager review even when application of the rule would otherwise indicate an automatic denial.

Figure 6A:
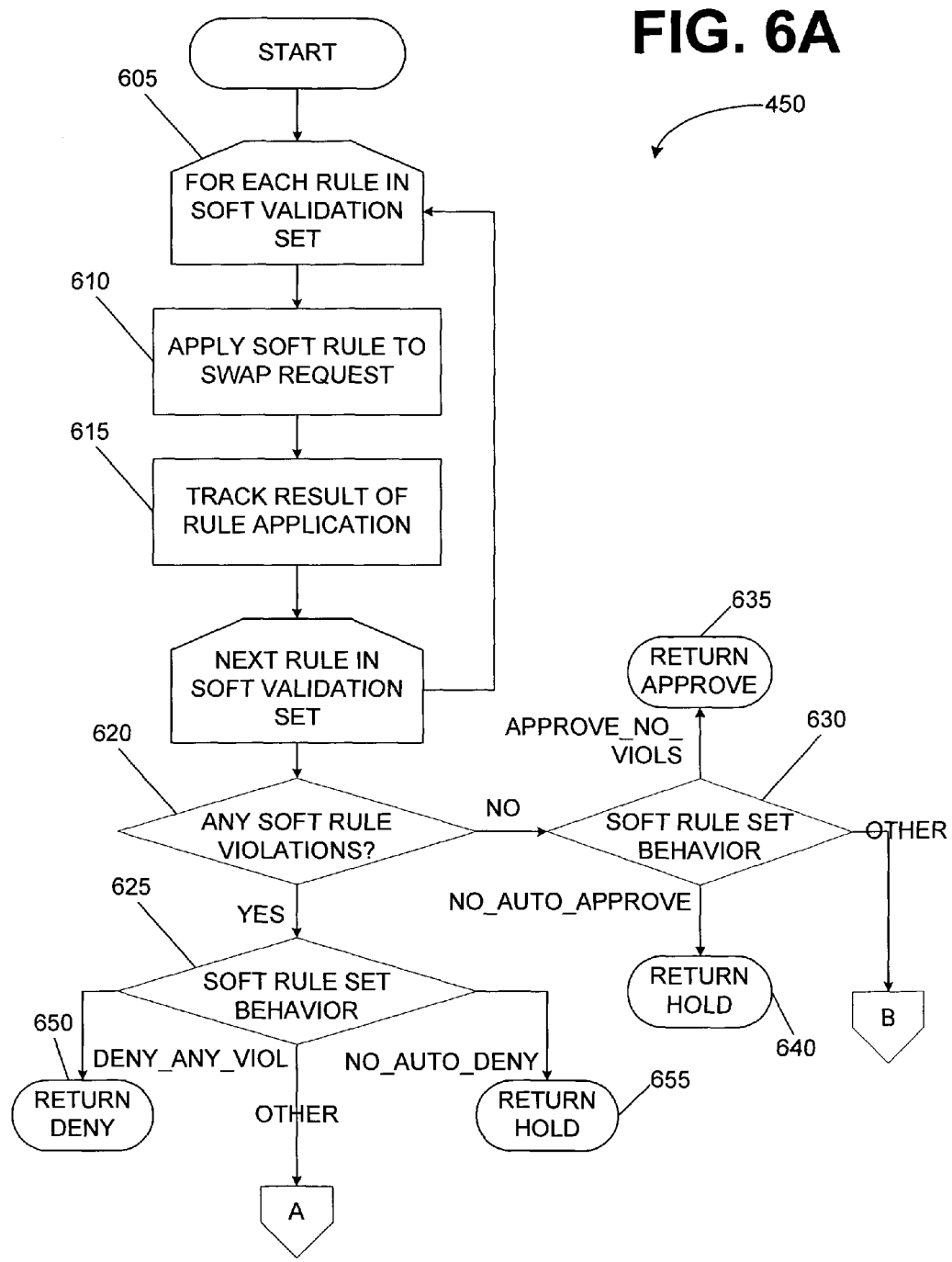
FIGS. 6A-B are a flowchart of a process of applying rules to a request and disposing of the request based on the rule behaviors in one embodiment of a system and method for partial shift swapping
Figure 6B:
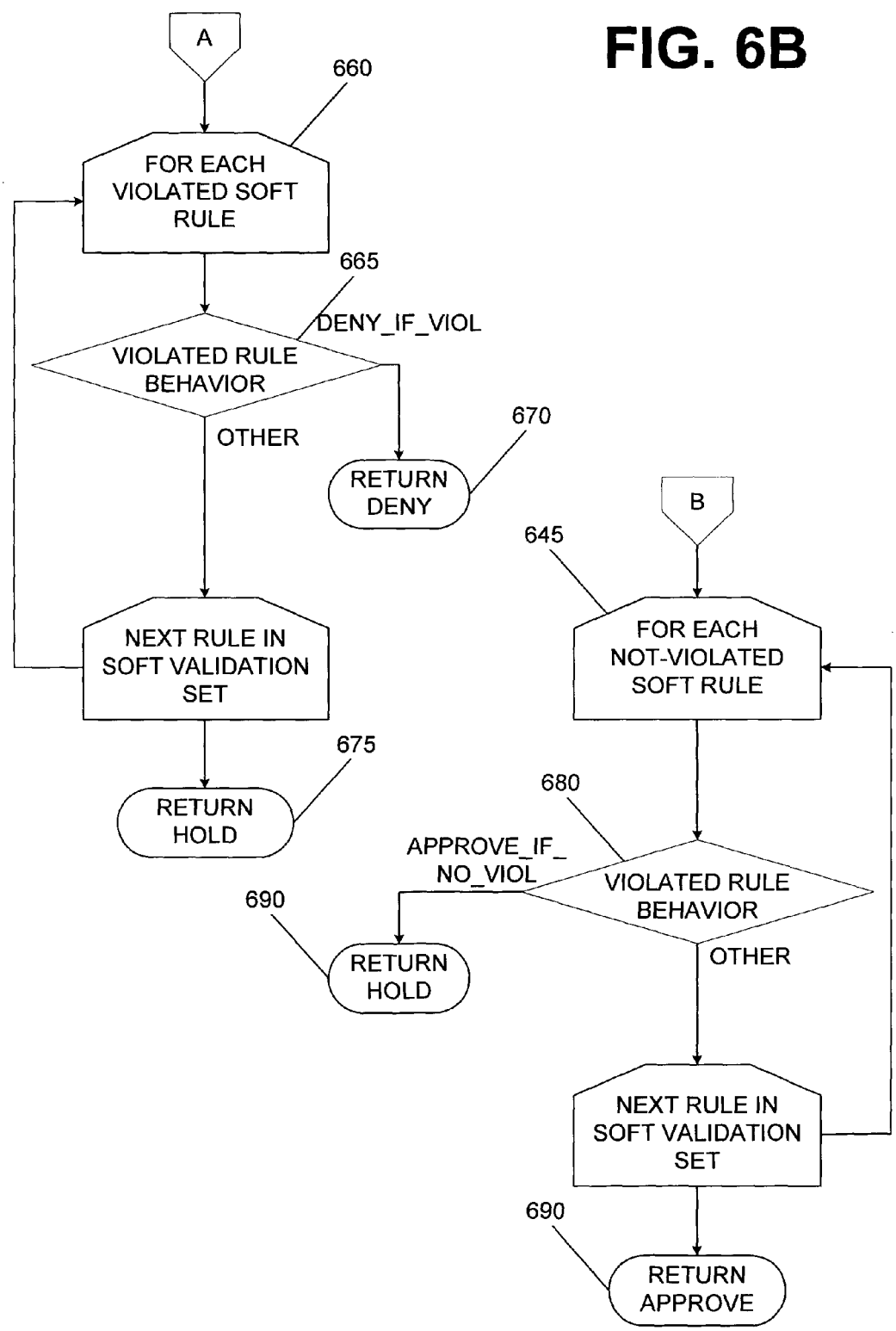

The process of applying rules to a request and disposing of the request based on the rule behaviors will be discussed in connection with the flowchart in FIGS. 6A-B. The process (450) of applying a set of soft validation rules begins at block 605 with an iteration loop that is applied for each rule in the set of soft validation rules associated with the partial shift swap request (240 or 340). Block 610 applies the current rule to the partial shift swap request (240 or 340) to determine whether or not the request violates the rule. Next, block 615 records whether the request violated the rule or the request passed the rule. Processing returns to block 610 with the next loop iteration.

After applying all rules in the set, processing continues at block 620, which determines (using information maintained in block 615) whether any of the soft validation rules have been violated. If any rule is violated, then processing continues at block 625, which will be discussed later. If no rule is violated, processing continues at block 630, where the global rule set behavior is examined. If the global behavior type is ApproveIfNoViolations, then the process returns, with a disposition of Approve, at block 635. If the global behavior type is NoAutomaticApprove, then the process continues at block 640, where the process returns with a disposition of Hold. Otherwise, processing continues at block 645, which will be discussed later.

Returning now to block 625, when at least one soft validation rule was violated, block 625 examines the global rule set behavior. If the global behavior type is DenyIfAnyViolations, then the process returns, with a disposition of Deny, at block 650. If the global behavior type is NoAutomaticDeny, then the process continues at block 655. Otherwise, processing continues at block 660.

Block 660 starts an iteration loop that is applied for each violated rule (as determined by block 615). Next, at block 665, the behavior of each violated rule is examined. If the rule behavior type is DenyIfViolated, then the process returns, with a disposition of Deny, at block 670. Otherwise, processing returns to block 665 for the next loop iteration, until the loop ends with all violated rules processed. At that point, the process returns, with a disposition of Suspend, at block 675.

Returning now to block 645, when no soft validation rule was violated and the global behavior block is not ApproveIfNoViolations or NoAutomaticApprove, block 645 starts an iteration loop that is applied for each non-violated rule (as determined by block 615). Next, at block 680, the behavior of each non-violated rule is examined. If the rule behavior type is ApproveIfNotViolated, then the process returns, with a disposition of Approve, at block 685. Otherwise, processing returns to block 645 for the next loop iteration, until the loop ends with all violated rules processed. At that point, the process returns, with a disposition of Approve, at block 690.

In this manner, the partial shift swap request (240 or 340) is automatically approved if either no rule violations were found and the global rule set behavior is ApproveIfNoViolations, or if at least one passing rule (non-violation) is found with a corresponding rule behavior of ApproveIfNotViolated. The partial shift swap request (240 or 340) is automatically denied if either at least one rule violation was found and the global rule set behavior is DenyIfAnyViolations, or if at least one rule violation is found with a corresponding rule behavior of DenyIfViolated. The request partial shift swap request (240 or 340) is held for manager review if no rule violations were found and the global rule set behavior is NoAutomaticApproval, or if at least one rule violation was found and the global rule set behavior is NoAutomaticDenial.

Some embodiments of partial shift swapping include a feature which allows agents to submit partial shift swap requests (240 or 340), which are then validated by the hard and soft validation rules. Two types of submission are described. In the first type of swap request submission, the request specifies both the offering shift (240O) and the accepting shift (240A). This type is appropriate when the offering agent has coordinated in advance with the accepting agent. That is, John and Fred have already worked out the swap details by which Fred will accept John's shift (one-way), or John will accept Fred's shift while Fred accepts John's shift (two-way).

In the second type of swap request submission, the offering agent "posts" his offered shift. The posted offerings can be viewed by other agents. A second agent can pick up a posted shift offering, at which point the swap request details have been determined, and the swap request is created. In either case, the partial shift swap request goes through hard and soft validation rule processing.

Figure 7:
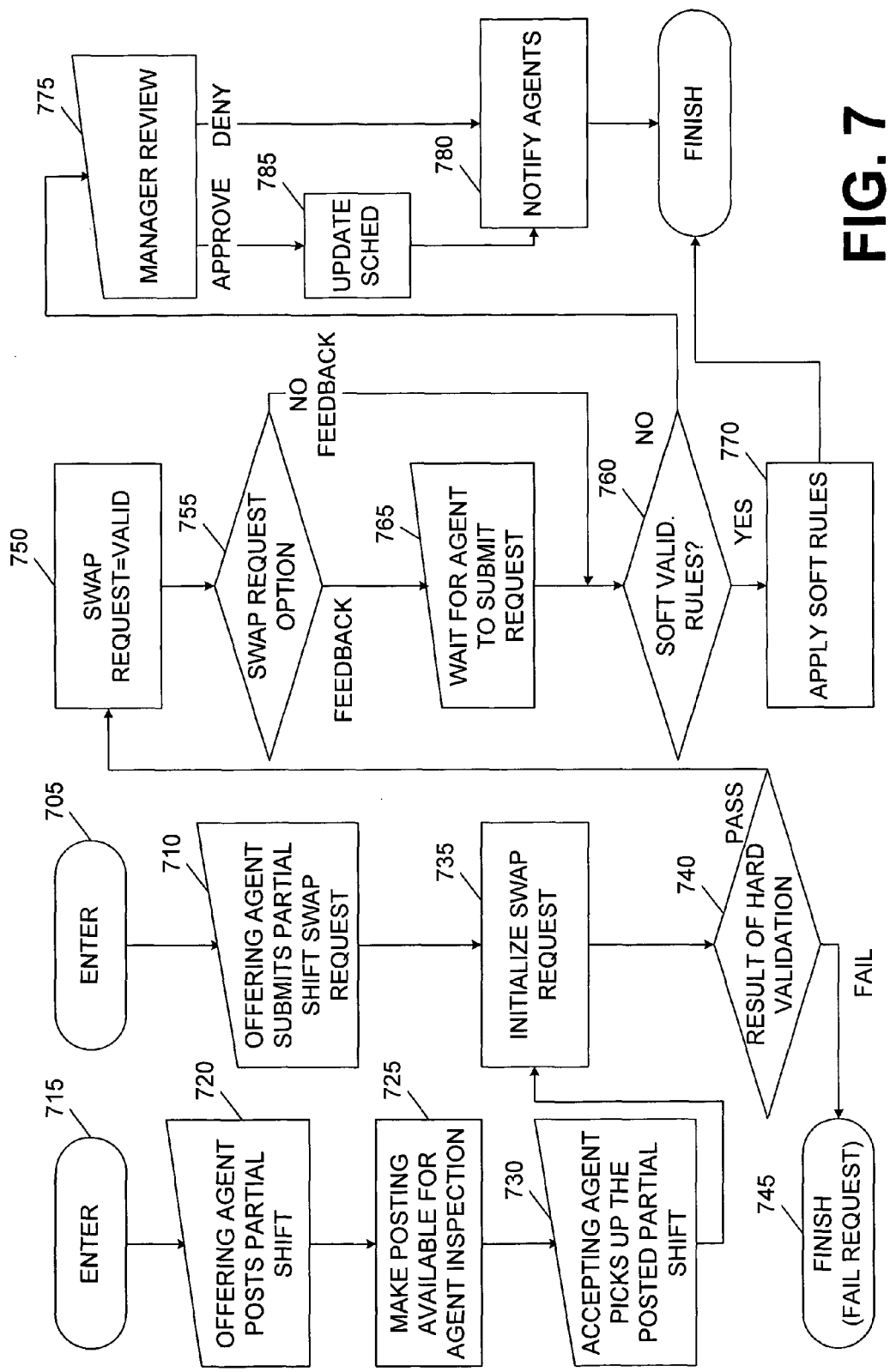
FIG. 7 is a flow chart of one embodiment of a submission process for partial shift swap requests.

FIG. 7 is a flow chart of one embodiment of a submission process for partial shift swap requests. The process 700 can be entered from multiple entry points. When entered at point 705, the offering agent submits at block 710 a partial shift swap request including details of the offering shift (340O), the accepting shift (340A), and the swap time range (340R). When entered at point 715, the offering agent posts (720) a portion of his shift, including details of the offering shift (340O) and the swap time range (340R). The accepting shift (340A) is not yet known, so its details are not included. At block 725, the posting is made available for viewing by other agents. Next, at block 730, an accepting agent chooses to accept the offered partial shift. A person of ordinary skill in the art should understand that a variety of posting/viewing/submitting mechanisms are available, so further details of such a mechanism are not included here.

Both entry pathways converge at block 735, where the submission information is used to create a partial shift swap request 340, with an offering shift (340O), an accepting shift (340A), and the swap time range (340R). In block 740 a determination is made as to whether the newly created swap request passes the hard validation rules (340H). Applying hard validation rules was described already in connection with FIG. 4. If the request failed hard validation, the swap request is marked as failed or invalid (block 745), and process 700 returns. If the request passed hard validation, the request is marked valid (block 750) and processing continues at block 755.

At block 755, an option in the partial shift swap request 340 is examined. A valid partial shift swap request 340 begins in a "Negotiation" state. Through an option associated with the swap request, the offering agent can choose to allow the other agent involved in the swap to submit the request to the manager, or to require feedback from the other agent before submission. When feedback is required, the request remains in the "Negotiation" state until both agents agree on the swap details, and one of them submits the request to the manager. In one embodiment, the manager cannot view swap requests that are in the "Negotiation" state.

If block 755 determines that the option is set to "Submit Without Feedback", then processing moves to block 760. Otherwise, then block 765 waits until the one of the agents has submitted the request after receiving feedback, then moves to block 760.

At block 760, process 700 determines whether any soft validation rules are associated with the organization. If soft validation rules exist, the submitted request is passed on, in block 770, to the soft validation rule engine. Processing of soft validation rules was described earlier in connection with FIG. 6. If no soft validation rules exist, then block 775 places the partial shift swap request 340 in a "Suspend" state and notifies the manager that the request should be reviewed. The manager reviews the partial shift swap request 340 and approves or denies the request.

In case of a denial, the two agents involved in the swap are notified of the decision (block 780). In the case of an approval, the two agents involved in the decision are notified of the decision (block 780), and the schedule 330 is updated (block 785) and then published. Process 700 is then complete.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method of operating a computer system to perform partial shift swapping, the method comprising the steps of:

generating a schedule comprising a plurality of shifts;
in the computer system:
receiving a partial shift swap request from an agent;
determining a disposition of the partial shift swap request by applying a set of criteria associated with a hard validation rule to the partial shift swap request;
if the partial shift swap request is denied based on the hard validation rule, denying the partial shift swap request;
if the partial shift swap request is not denied based on the hard validation rule, applying a set of criteria associated with a soft validation rule to the partial shift swap request;
if the partial shift swap request is not approved based on the soft validation rule, providing the partial shift swap request for review; and
if the disposition indicates the partial shift swap request is approved, updating the schedule to reflect the partial shift swap request.

2. The method of claim 1, further comprising the steps of:
receiving, from an offering agent, an offer of a partial shift swap, the offer including an offering shift and a swap time range;
receiving, from an accepting agent, an acceptance of the offer, the acceptance including an accepting shift; and
creating the partial shift swap request based on the offer and the acceptance.

3. The method of claim 1, further comprising the step of:
receiving, from an offering agent, the partial shift swap request, the partial shift swap request including an offering shift, an accepting shift, and a swap time range.

4. The method of claim 1, wherein the method further comprises the step of:
if the disposition indicates the partial shift swap request is denied, notifying at least one of an offering agent and an accepting agent of the denial.

5. The method of claim 4, wherein one of the criteria associated with the hard validation rule includes a comparison of skills associated with an agent offering the partial shift swap request and skills associated with an agent accepting the partial shift swap request.

6. The method of claim 1, wherein the method further comprises the steps of:
in the computer system, if the disposition indicates the partial shift swap request is denied, notifying at least one of an offering agent and an accepting agent of the denial; and
wherein the step of applying the set of criteria associated with the soft validation rule to the partial shift swap request is perform upon examining an option associated with the partial shift swap request and the option indicates that agent feedback is not required.

7. The method of claim 1, wherein the method further comprises the steps of:
in the computer system, if the disposition indicates the partial shift swap request is denied, notifying at least one of the offering agent and the accepting agent of the denial; and
wherein the step of applying the set of criteria associated with the soft validation rule to the partial shift swap request is perform upon examining an option associated with the partial shift swap request and if the option indicates that agent feedback is required, waiting for submission of the partial shift swap request by one of an offering agent or an accepting agent.

8. The method of claim 1, wherein one of the criteria associated with the soft validation rule comprises compliance with a work rule.

9. The method of claim 1, further comprising the steps of, in the computer system:
if the partial shift swap request is approved based on the soft validation rule, suspending the partial shift swap request;
if the partial shift swap request is suspended, submitting the partial shift swap request for review by a user;
receiving a final disposition from the user indicating approval or denial of the partial shift swap request; and
if the final disposition indicates the partial shift swap request is approved, updating the schedule to reflect the partial shift swap request.

10. The method of claim 1, further comprising the steps of, in the computer system:
if the partial shift swap request is approved based on the soft validation rule, suspending the partial shift swap request;
if the partial shift swap request is suspended, submitting the partial shift swap request for review by a user;
receiving a final disposition from the user indicating approval or denial of the partial shift swap request; and
if the final disposition indicates the partial shift swap request is denied, notifying at least one of an offering agent and an accepting agent of the denial.

11. A computer-readable medium having a computer program stored thereon, the computer program comprising computer-executable instructions for performing a method of operating a computer system to perform partial shift swapping, the method comprising the steps of:
generating a schedule comprising a plurality of shifts;
receiving a partial shift swap request from an agent;
determining a disposition of the partial shift swap request by applying a set of criteria associated with a hard validation rule to the partial shift swap request;
if the partial shift swap request is denied based on the hard validation rule, denying the partial shift swap request;
if the partial shift swap request is not denied based on the hard validation rule, applying a set of criteria associated with a soft validation rule to the partial shift swap request;
if the partial shift swap request is not approved based on the soft validation rule, providing the partial shift swap request for review; and
if the disposition indicates the partial shift swap request is approved, updating the schedule to reflect the partial shift swap request.

12. The computer-readable medium of claim 11, further comprising the steps of:
receiving, from an offering agent, an offer of a partial shift swap, the offer including an offering shift and a swap time range;
receiving, from an accepting agent, an acceptance of the offer, the acceptance including an accepting shift; and
creating the partial shift swap request based on the offer and the acceptance.

13. The computer-readable medium of claim 11, further comprising the step of:
receiving, from an offering agent, the partial shift swap request, the partial shift swap request including an offering shift, an accepting shift, and a swap time range.

14. The computer-readable medium of claim 11, wherein the method further comprises the step of:
if the disposition indicates the partial shift swap request is denied, notifying at least one of an offering agent and an accepting agent of the denial.

15. The computer-readable medium of claim 14, wherein one of the criteria associated with the hard validation rule includes a comparison of skills associated with an agent offering the partial shift swap request and skills associated with an agent accepting the partial shift swap request.

16. The computer-readable medium of claim 11, wherein the method further comprises the steps of:
   in the computer system, if the disposition indicates the partial shift swap request is denied, notifying at least one of an offering agent and an accepting agent of the denial; and
   wherein the step of applying the set of criteria associated with the soft validation rule to the partial shift swap request is perform upon examining an option associated with the partial shift swap request and the option indicates that agent feedback is not required.

17. The computer-readable medium of claim 11, wherein the method further comprises the steps of:
   in the computer system, if the disposition indicates the partial shift swap request is denied, notifying at least one of the offering agent and the accepting agent of the denial; and
   wherein the step of applying the set of criteria associated with the soft validation rule to the partial shift swap request is perform upon examining an option associated with the partial shift swap request and if the option indicates that agent feedback is required, waiting for submission of the partial shift swap request by one of an offering agent or an accepting agent.

18. The computer-readable medium of claim 11, wherein one of the criteria associated with the soft validation rule comprises compliance with a work rule.

19. The computer-readable medium of claim 11, further comprising the steps of, in the computer system:
   if the partial shift swap request is approved based on the soft validation rule, suspending the partial shift swap request;
   if the partial shift swap request is suspended, submitting the partial shift swap request for review by a user;
   receiving a final disposition from the user indicating approval or denial of the partial shift swap request; and
   if the final disposition indicates the partial shift swap request is approved, updating the schedule to reflect the partial shift swap request.

20. The computer-readable medium of claim 11, further comprising the steps of, in the computer system:
   if the partial shift swap request is approved based on the soft validation rule, suspending the partial shift swap request;
   if the partial shift swap request is suspended, submitting the partial shift swap request for review by a user;
   receiving a final disposition from the user indicating approval or denial of the partial shift swap request; and
   if the final disposition indicates the partial shift swap request is denied, notifying at least one of an offering agent and an accepting agent of the denial.

\* \* \* \* \*